Patented Oct. 16, 1923.                                                                 1,470,811

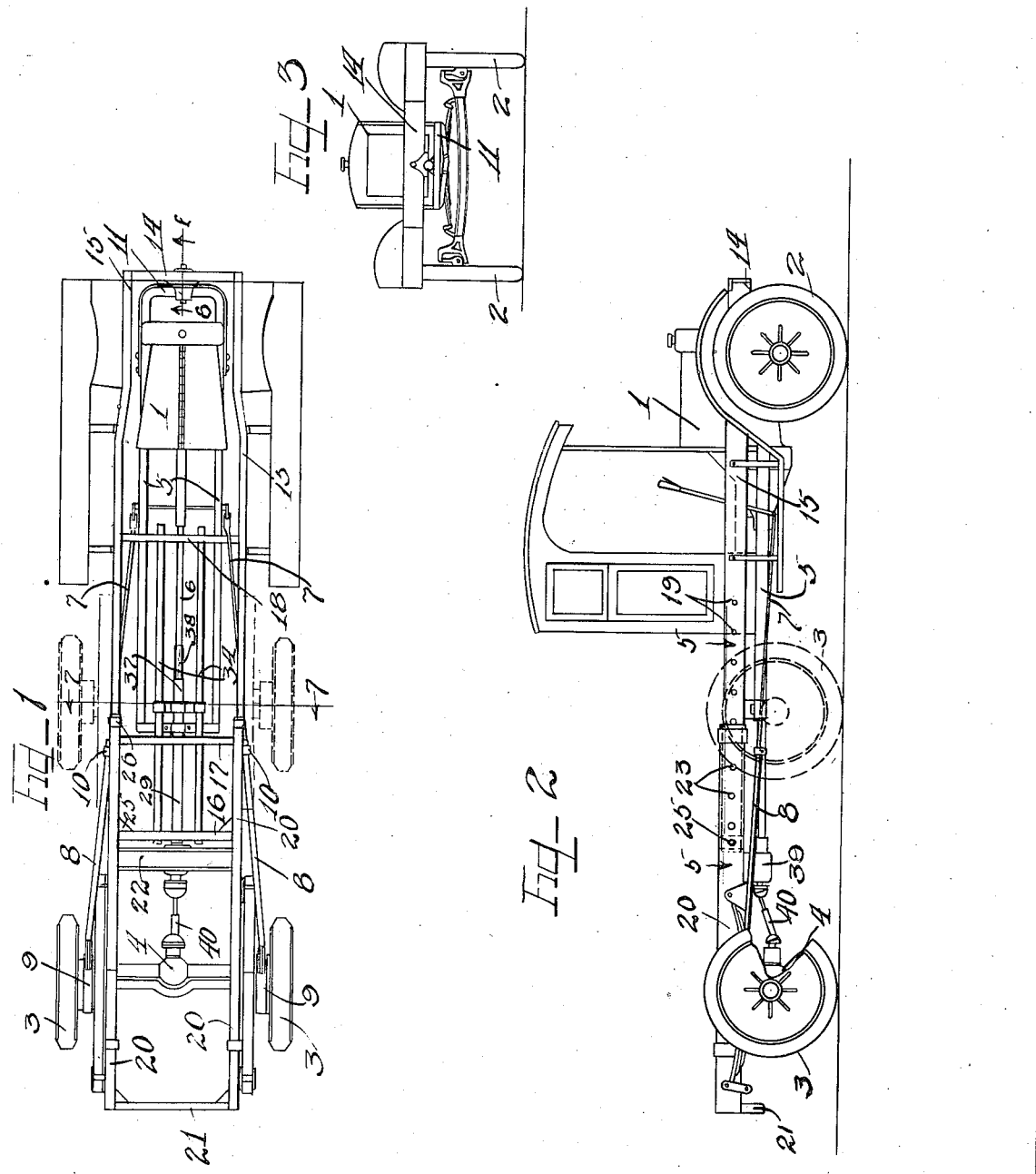

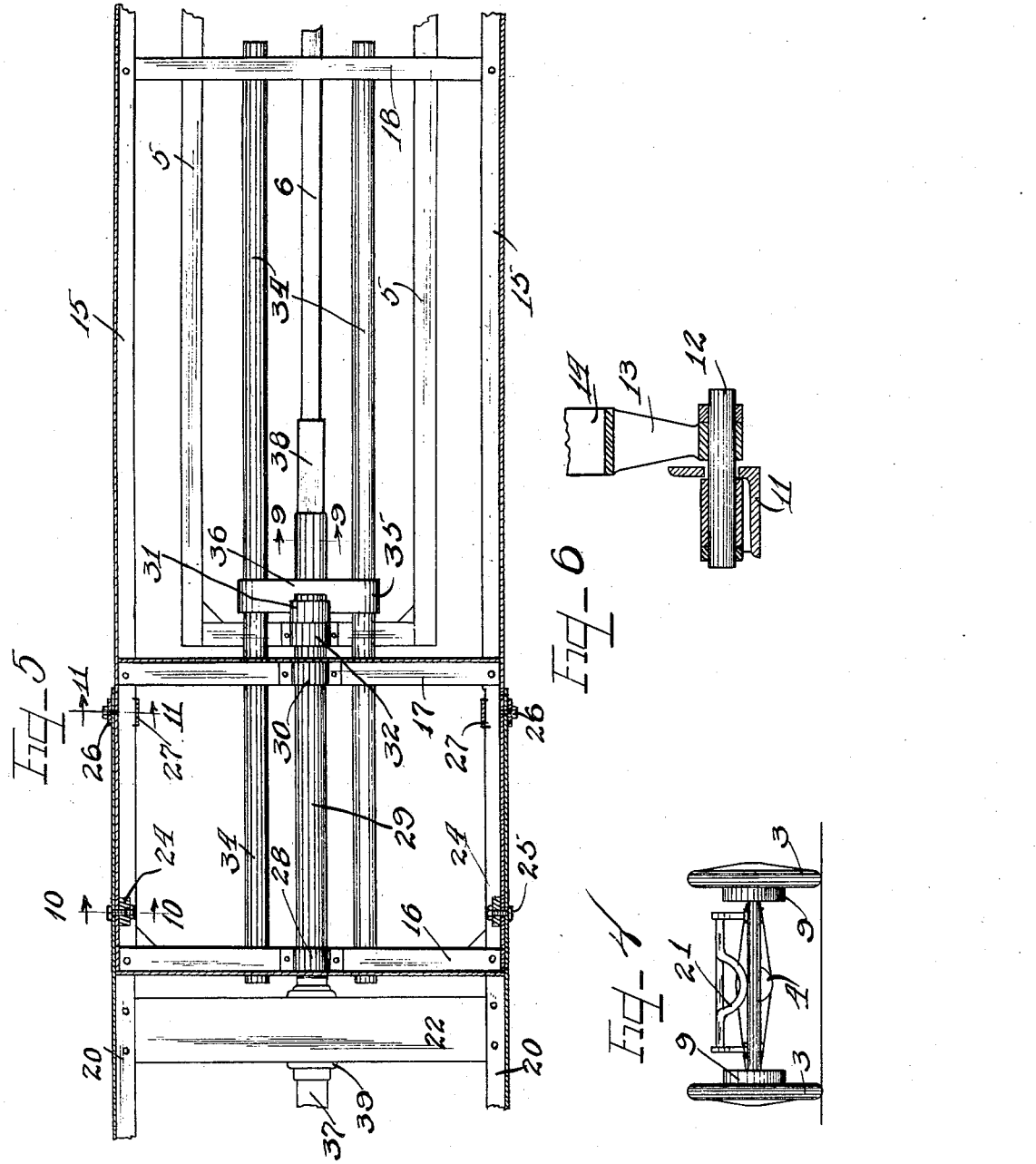

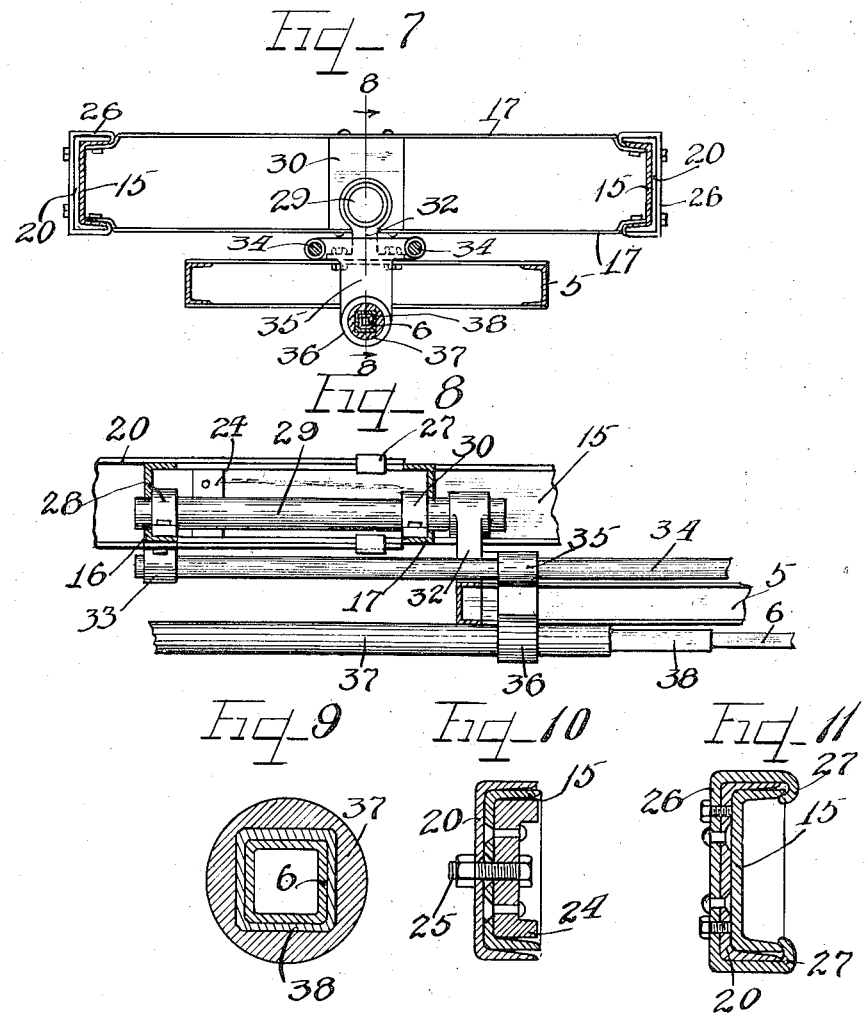

UNITED STATES PATENT OFFICE.

ALBERT EUGENE COOK, OF EVANSTON, AND THOMAS VAN TUYL, OF KANKAKEE, ILLINOIS; SAID VAN TUYL ASSIGNOR TO SAID COOK.

EXTENSIBLE FRAME FOR COMBINATION MOTOR VEHICLES.

Application filed November 10, 1919. Serial No. 336,807.

*To all whom it may concern:*

Be it known that we, ALBERT E. COOK and THOMAS VAN TUYL, citizens of the United States, and residents of the city of Evanston, in the county of Cook and State of Illinois, and of the city of Kankakee, in the county of Kankakee and State of Illinois, respectively, have invented certain new and useful Improvements in an Extensible Frame for Combination Motor Vehicles; and we do hereby declare that the following is a full, clear, and exact description of the same, reference being had to the accompanying drawings, and to the numerals of reference marked thereon, which form a part of this specification.

This invention relates more particularly to a double three-point suspension frame for use on combination motor vehicles, and constructed to permit the same to be extended or shortened as desired.

It is an object of this invention to provide a vehicle with an extensible frame.

Another object of this invention is the construction of an adjustable telescoping frame adapted to be removably attached to a motor vehicle.

A further object of the invention is the construction of an extensible frame adapted to be removably attached to a vehicle frame and permitting the rear driving mechanisms of said vehicle to be supported thereon and movable therewith when adjusted.

It is an important object of this invention to construct a two-section telescoping frame adapted to be attached to a vehicle frame to support the rear driving mechanisms in operative connection with the vehicle motor.

It is also an object of the invention to provide a power vehicle with a three-point suspension extensible frame and an extensible driving shaft.

It is furthermore an object of this invention to provide a three-point suspension motor vehicle with a three-point suspension tractor or truck attachment to prevent torque from the attachment section from being transmitted to the vehicle section.

It is a further object of the invention to construct an adjustable combination vehicle with an extensible shaft mechanism and brake rods.

Other and further important objects of this invention will be apparent from the disclosures in the drawings and specification.

The invention (in a preferred form) is illustrated in the drawings and hereinafter more fully described.

On the drawings:

Figure 1 is a top plan view of a motor vehicle equipped with an extensible frame embodying the principles of this invention.

Figure 2 is a side elevation thereof partly broken away.

Figure 3 is a front end elevation of the device.

Figure 4 is a rear end elevation.

Figure 5 is an enlarged fragmentary detail sectional view taken on the line 5—5 of Figure 2.

Figure 6 is a detail section taken on line 6—6 of Figure 1.

Figure 7 is a transverse section taken on line 7—7 of Figure 1.

Figure 8 is a fragmentary detail section taken on line 8—8 of Figure 7 with parts in elevation.

Figure 9 is an enlarged detail section of the telescoping driving shafts taken on line 9—9 of Figure 5.

Figure 10 is an enlarged detail section taken on line 10—10 of Figure 5.

Figure 11 is an enlarged detail section taken on line 11—11 of Figure 5.

As shown on the drawings:

The reference numeral 1 indicates an automobile provided with front wheels 2, rear wheels 3, a rear driving mechanism 4, and a chassis frame 5. The regular automobile driving shaft 6, is tubular and of rectangular cross-section. The automobile brake rods are indicated by the reference numeral 7, and said brake rods are adjustably connected with brake tubes 8, the rear ends of which are connected to the rear brakes 9. Clamping members 10 are provided for holding the brake rods locked in adjusted position with respect to the brake tubes 8.

Rigidly secured to the front end of the chassis frame sills are the arms of a U-shaped angle bracket or support 11. A horizontal pin or stub shaft 12 is supported centrally in the bracket 11. Engaged on the outer projecting end of the pin 12 is the lower end of an upright arm 13, the upper end of which is rigidly secured to the middle portion of the front crossbar 14 of an extensible three-point suspension frame. The extensible frame comprises two adjustable telescoping sections. The front or forward section embraces the crossbar 14, to the ends of which are rigidly secured the front ends of channel side sills 15, which are rigidly connected together by pairs of cross braces or plates 16, 17 and 18. Each of the front section sills 15 is provided with a longitudinal row of openings 19.

The rear frame section comprises channel side sills 20, the rear ends of which are rigidly connected together by a centrally depressed cross bar or brace 21. A transverse brace 22 is also used to connect the sills 20, near their front ends. Each of the rear channel sills 20 is provided with a longitudinal row of openings 23. An apertured channel member 24 is riveted in the rear portion of each of the front channel sills 15. Bolts 25 are used to removably connect the front and rear frame sections in an adjusted position. As clearly shown in Figure 11, hooked channel guide members 26 are secured to the rear sills 20, with the hooks 27 engaging around the flanges of the front sills 15.

As shown in Figure 8, a supporting member 28 is secured centrally between the upper and lower cross braces 16. Secured to said support 28 is the rear end of a horizontal stub guide shaft 29, the front end of which slidably projects through a guide support 30 secured between the upper and lower cross braces 17. A collar 31 is secured on the front end of the stub shaft 29. Engaged on the front portion of the shaft 29 between the collar 31 and the support 30 is a sleeve of a hanger 32, which supports the rear end of the automobile chassis frame 5, affording a three-point suspension for said chassis frame. Secured on the bottom of the lower cross braces 16 and 18, are supports 33, for rigidly holding two parallel spaced guide rods 34 in position. Slidably engaged on the rods 34 is a hanger 35, provided with a depending sleeve 36, through which a cylindrical driving shaft 37 slidably projects. The shaft section 37 is provided with a rectangular longitudinal passage for slidably receiving an intermediate rectangular shaft tube 38, into which the main driving shaft tube 6 telescopes, thereby providing an extensible driving shaft mechanism for the vehicle. The rear end of the shaft section 37 is supported in a bearing bracket 39, secured on the bottom of the transverse brace 22. A universal coupling 40 connects the rear shaft section 37 with the automobile differential.

The operation is as follows:

In Figure 1 the dotted lines disclose the normal position of the rear wheels 3 of a motor vehicle. When the vehicle is equipped with an extensible three-point suspension frame of the type described, the automobile rear driving mechanism is supported on the rear portion of the rear extensible frame section 20—21 as shown. The brake rods 7 are adjustably connected with the auxiliary brake rods 8 to permit operation of the brakes 9. The drive from the vehicle motor is transmitted to the rear driving differential mechanism 4 by means of the extensible telescoping shaft sections 6, 38 and 37.

The combination motor vehicle is of a double three-point suspension type, the extensible frame being supported at its front end on the short shaft member 12, and at its rear end by the two wheels 3. The automobile frame 5 is supported at its front end by the two front wheels 2 and at its rear end by the hanger bracket 32. This construction of the frame sections prevents the transmission of torque from the extensible frame to the automobile frame 5.

The front and rear sections comprising the extensible frame are slidably connected with the front sill members 15 telescoping into the rear sill members 20. The extensible frame sections are adapted to be adjusted with respect to one another and then locked in said adjusted positions by the locking bolts 25, which are adapted to be projected through the registering openings 19 and 23 of the frame sills. The telescoping driving shaft and the brake rod members are adjustable with the adjustment of the extensible frame sections.

From the novel construction disclosed it will be noted that considerable variation in the length of the three-point suspension extensible frame is permitted by simply removing the bolts 25 and sliding the frame sections with respect to one another until the desired length is reached. The frame sections are then bolted together.

It will of course be understood that numerous other arrangements may be provided for permitting longitudinal adjustment of the extensible frame sections to vary the length of the motor vehicle.

We are aware that numerous details of construction may be varied through a wide range without departing from the principles of this invention, and we therefore do not purpose limiting the patent granted otherwise than necessitated by the prior art.

We claim as our invention:

1. The combination with a vehicle chassis frame, of an auxiliary frame, driving wheels supporting the rear end of the auxiliary frame, a one point suspension bracket connecting the front end of the auxiliary frame with the front end of the chassis frame, front wheels supporting the front end of the chassis frame, and a one point suspension bracket connecting the rear end of the chassis frame with the auxiliary frame.

2. The combination with a vehicle chassis frame, of an extensible auxiliary frame disposed thereabove, wheels supporting said frames, and one point suspension brackets at both ends of one of said frames for connecting said frame to the other.

3. The combination with a vehicle chassis frame, of a truck attachment frame, and one point suspension brackets at the opposite ends of said chassis frame for connecting the same to said truck frame.

4. The combination of two vehicle frames each supported at one end by two wheels, and a support at the opposite end of each frame connected to the other frame to form a vehicle embracing two three point suspension sections.

5. The combination with a vehicle frame and motor, of front wheels supporting the front end of the vehicle frame, an extensible auxiliary frame, one point supporting means for removably connecting the front end of the auxiliary frame to the front end of the vehicle frame, a one point support mechanism connecting the rear end of the vehicle frame to the auxiliary frame, driving wheels supported near the rear end of said auxiliary frame, an extensible driving shaft connecting the motor with said driving wheels, brakes on said driving wheels, a control lever for said brakes, and extensible brake rods connecting said control lever with said brakes.

In testimony whereof we have hereunto subscribed our names in the presence of two subscribing witnesses.

ALBERT EUGENE COOK.
THOMAS VAN TUYL.

Witnesses:
EARL M. HARDINE,
CHARLES W. HILLS, Jr.